H. L. TOOKER.
SOFT COLLAR CLASP.
APPLICATION FILED MAY 6, 1921.
1,429,804.   Patented Sept. 19, 1922.
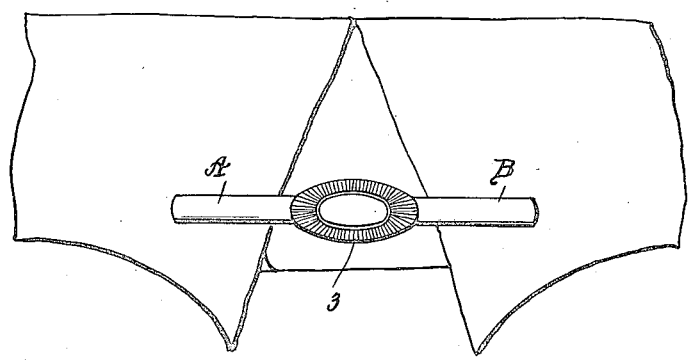
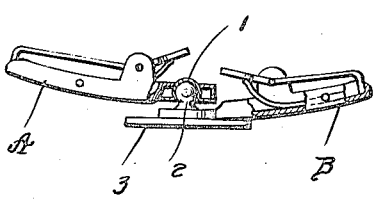
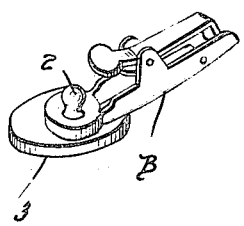   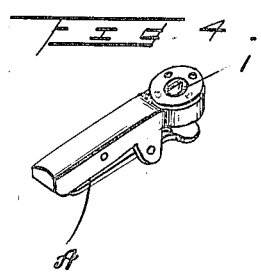
Inventor
H. L. Tooker

Patented Sept. 19, 1922.

1,429,804

UNITED STATES PATENT OFFICE.

HARRY L. TOOKER, OF TAUNTON, MASSACHUSETTS.

SOFT-COLLAR CLASP.

Application filed May 6, 1921. Serial No. 467,508.

*To all whom it may concern:*

Be it known that I, HARRY L. TOOKER, a citizen of the United States, residing at Taunton, in the county of Bristol and State of Massachusetts, have invented certain new and useful Improvements in Soft-Collar Clasps; and I do hereby declare the following to be a full, clear, and exact description of the invention, such as will enable others skilled in the art to which it appertains to make and use the same.

The invention relates to fasteners for apparel of the separable type, being designed most especially for connecting the ends of soft shirt collars which require to be confined in order to present a neat and tidy appearance.

The invention provides a fastener of the type aforesaid embodying complemental members, each member being capable of ready detachable connection with an end of the collar, and both members including separable snap fastening means, such as a socket and stud, whereby the members may be easily, conveniently and quickly coupled and uncoupled without necessitating the detachment of either of the members from the collar after being properly applied thereto.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a front view of the fastener, showing the same applied,

Figure 2 is an edge view of the fastener partly in section, and

Figures 3 and 4 are detail views of the socket and stud members, respectively.

Corresponding and like parts are referred to in the following description and designated in the several views of the drawings by like reference characters.

The clasp or fastener comprises complemental members A and B of similar formation, each consisting of a spring clip for ready and convenient engagement with or disengagement from the parts to be connected. The spring clip A is provided at one end with a socket 1 and the spring clip B is provided at the corresponding end with a stud 2. The parts 1 and 2 may be of any ordinary construction such as employed in the manufacture of separable or snap fasteners. When the members A and B are coupled their opposing ends, provided with the socket 1 and stud 2, overlap, and the stud member B occupies the outermost position and for this reason the coupling end thereof is provided with a plate 3 constituting an ornament which overlaps the joint between the two members and gives a finished effect to the clasp. The ornamental element 3 occupies a central position and may be of any design or ornamentation.

In practice, the members A and B of the clasp or fastener are attached to the ends of the collar, as indicated in Figure 1, or to any other part to be connected in a manner well understood. After the members A and B have been applied, it is not necessary to detach either one from the part when placing the collar in position or removing it from the shirt. The members A and B may be easily and quickly coupled and uncoupled by engaging or disengaging the socket and stud elements which may be effected in a rapid and convenient manner, as well understood in the art.

What is claimed is:

A clasp comprising clasp members operable independently of each other, said members each having an extension, one of the extensions having a socket and the other extension having a stud to separably enter said socket to rigidly connect the clasp members together, and one of said extensions constituting a plate disposed for engagement by the fingers simultaneously with the actuating means of the clasp members to coact therewith.

In testimony whereof I affix my signature in presence of two witnesses.

HARRY L. TOOKER.

Witnesses:
WILLIAM A. BELLAMY,
JOHN HEAVEY.